United States Patent [19]

Marrison et al.

[11] Patent Number: 5,211,197

[45] Date of Patent: May 18, 1993

[54] QUICK DISCONNECT LIQUID LINE COUPLING WITH VOLUMERTRIC EXPANSION COUPING ELEMENT

[75] Inventors: William C. Marrison, Jackson; Russell L. Rogers, Munith, both of Mich.

[73] Assignee: Aeroquip Corporation, Maumee, Ohio

[21] Appl. No.: 816,825

[22] Filed: Jan. 3, 1992

[51] Int. Cl.[5] .............................................. F16L 37/28
[52] U.S. Cl. .............................. 137/614.04; 137/614; 251/149.6
[58] Field of Search ............... 251/149.1, 149.3, 149.6, 251/149.8; 137/614, 614.02, 614.03, 614.04, 614.05, 614.06

[56] References Cited

U.S. PATENT DOCUMENTS

| | | | |
|---|---|---|---|
| 3,525,361 | 8/1970 | Cerbin et al. | 137/614.04 |
| 4,429,713 | 2/1984 | Walter | 137/614.03 |
| 4,924,909 | 5/1990 | Wilcox | 137/614.03 X |
| 5,016,671 | 5/1991 | Barwise | 137/614 X |

*Primary Examiner*—Martin P. Schwadron
*Assistant Examiner*—Kevin L. Lee

[57] ABSTRACT

A quick disconnect coupling for a liquid line, the coupling having male and female coupling elements each of which is closed to flow in an uncoupled state and opened to flow when coupled. The male coupling element is made up of an outer annular member and an annular body which is positioned within the annular member and which is slidable with respect thereto, an annular retainer being positioned concentrically between the annular member and the annular body and being affixed to the annular member to be non-slidable with respect thereto. The annular body is resiliently biased against an internal shoulder of the annular member by a wave spring which is trapped between an external shoulder of the annular body and an inturned flange of the annular retainer, A valve member is positioned within the annular body and is slidable with respect thereto. The valve member has an imperforate outer end which closes the annular body to fluid flow in its most advanced position, to which it is biased in an uncoupled condition of the male coupling element by a coil spring. A condition of excessive pressure within the uncoupled male coupling element will cause the valve member and the annular body to move in unison with respect to the anhular member and the annular retainer, against the biasing effect of the wave spring, to thereby increase the internal volume of the coupling element ahd relieve a condition of excessive pressure therein.

16 Claims, 4 Drawing Sheets

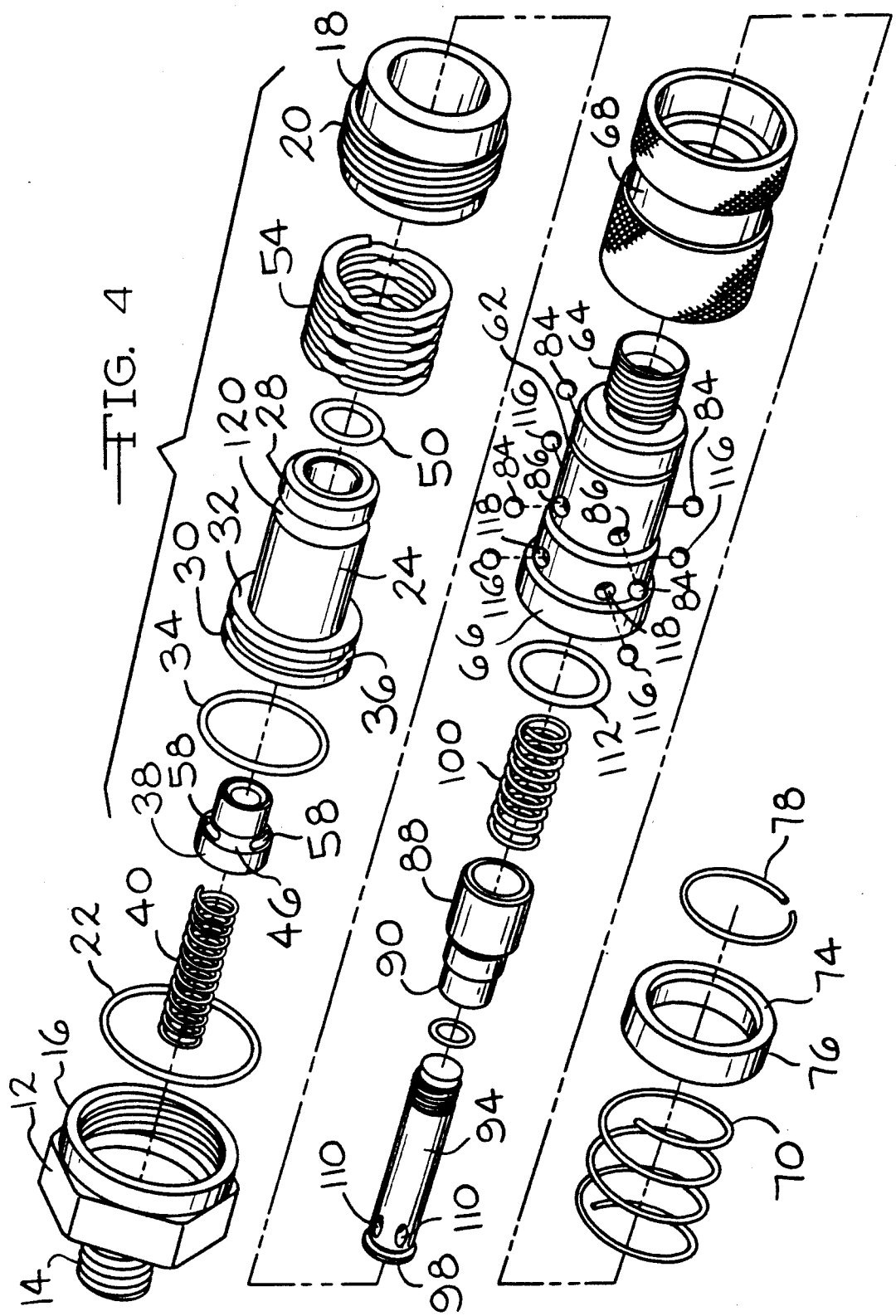

QUICK DISCONNECT LIQUID LINE COUPLING WITH VOLUMERTRIC EXPANSION COUPING ELEMENT

BACKGROUND OF THE INVENTION

This invention relates to a quick disconnect liquid line coupling which is made up of mating male and female coupling elements. More particularly, this invention relates to a quick disconnect liquid line coupling whose male coupling element, when uncoupled, is capable of volumetric expansion to be able to relieve a condition of excessive pressure without venting or spillage.

The coupling elements of a quick disconnect liquid line coupling are capable of being coupled together to form a substantially leak free flow path for liquid to flow from one conduit section to another and are capable of being quickly disconnected from one another, for example, for system maintenance or replacement of a component which includes one or another of the separate conduit sections to which the coupling elements are affixed. In a coupling of such type, it is important that each of the coupling elements be closed to flow in an uncoupled condition of the coupling elements, to prevent spillage or leakage of the liquid in the line.

It is also important, in an uncoupled condition of the coupling elements of a quick disconnect coupling for a liquid line, that the coupling element for the higher pressure or upstream coupling element be capable of relieving a condition of excessive pressure, a condition which can occur, for example, due to an increase in the temperature of the liquid trapped within a relatively fixed volume. Heretofore, it has been known to provide a coupling element with a pressure relief valve to vent a portion of the trapped liquid during such a condition of excessive pressure. Unfortunately, in a coupling element of this type, the vented liquid is usually spilled or is otherwise put in an uncontained state, and this can contaminate the storage area where the system is installed, especially if the liquid in question is corrosive or otherwise environmentally objectionable.

SUMMARY OF THE INVENTION

According to the present invention there is provided a quick disconnect liquid line coupling with a male coupling element which is capable of expanding in its internal volume to relieve a condition of excessive pressure that could otherwise develop therein, for example, due to an increase in the temperature of a fixed volume of liquid contained therein or in an enclosed line in communication therewith. The male coupling element includes an annular body through which liquid flows when the male coupling element is coupled to a female coupling element, and the annular body is slidably received within an annular retainer. The annular body has a radial shoulder which is spaced from an inturned flange of the annular retainer, and a wave spring is trapped between the radial shoulder of the annular body and the inturned flange of the annular retainer to resiliently bias the annular body against a fixed stop where the internal volume of the male coupling element is at a minimum. A buildup in internal pressure within the male coupling element will cause the annular body to slide within the annular retainer, against the restoring force of the wave spring, to thereby increase the internal volume of the male coupling element and relieve a condition of excessive pressure therein.

Accordingly, it is an object of the present invention to provide an improved quick disconnect coupling for a liquid line. More particularly, it is an object of the present invention to provide a quick disconnect coupling for a liquid line with a coupling element which is capable, when uncoupled and closed to flow, of increasing its internal volume in response to a condition of excessive pressure to thereby relieve the condition of excessive pressure.

For a further understanding of the present invention and the objects thereof, attention is directed to the drawing and the following brief description thereof, to the detailed description of the preferred embodiment, and to the appended claims.

BRIEF DESCRIPTION OF THE DRAWING

FIG. 4 is an exploded, perspective view of the coupling elements of the coupling of the present invention.

DETAILED DESCRIPTION OF THE PREFERRED EMBODIMENT

Figure 1:
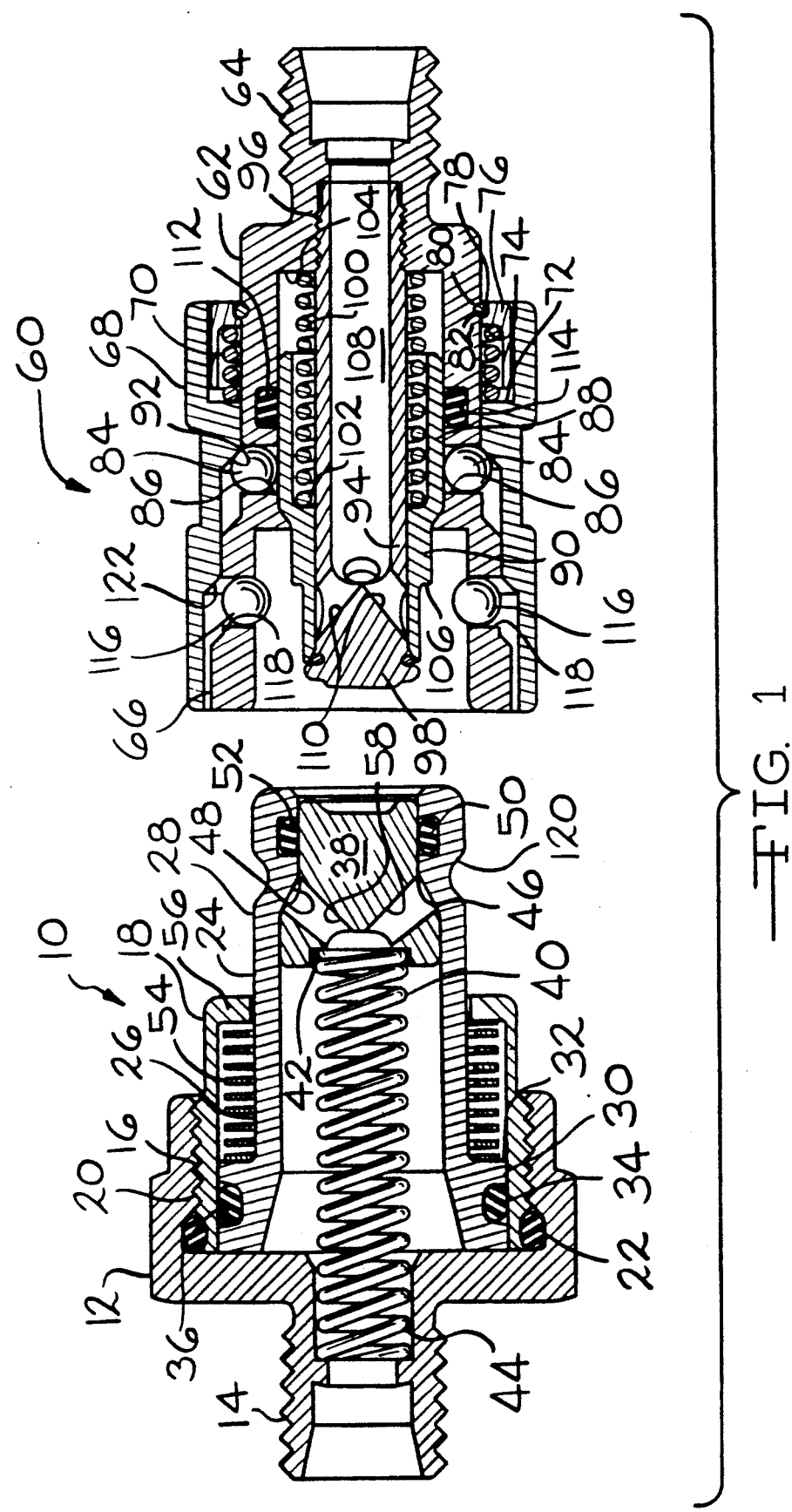
FIG. 1 is an exploded view, in cross-section, of the elements of a quick disconnect coupling in accordance with the preferred embodiment of the present invention and in a disassembled or uncoupled relationship with one another.

A coupling according to the preferred embodiment of the present invention is made up of a male coupling element, indicated generally by reference numeral 10, and a female coupling element, indicated generally by reference numeral 60. The male coupling element 10 includes an outer annular member 12 having an externally threaded, reduced diameter conduit connection end portion 14 which is adapted to be connected to a free end of a liquid conduit section, not shown. The annular member 12 further has an internally threaded, coupling end portion 16, and the male coupling element 10 also includes an annular retainer 18, an externally threaded inner end portion 20 of which is threadably connected to the coupling end portion 16 of the male coupling element 10. Thus, when the coupling element 10 is installed, no substantial relative axial motion can occur between the annular member 12 and the annular retainer 18. A nitrile O-ring 22 is trapped between the free end of the inner end portion 20 of the annular retainer 18 and the surrounding portion of the annular member 12 to substantially prevent liquid leakage therebetween.

The male coupling element 10 further includes an annular body 24, an inner end portion 26 of which is surrounded by the annular retainer 18 and an outer end portion 28 of which extends substantially beyond the annular retainer 18 and represents the outermost end of the coupling element 10, which is the downstream end in the normal direction of fluid flow through the coupling element 10. A free end 30 of the inner end portion 26 of the annular body 24 is substantially larger in diameter than the remaining portions of the annular body 24 and forms a generally radially extending outer shoulder 32 therewith. A nitrile O-ring 34 is trapped within a radial recess 36 in the free end 30 of the annular body 24 and the surrounding portion of the annular retainer 18, whose inner diameter is only slightly greater than the outer diameter of the free end 30 of the annular body 24, to substantially prevent liquid leakage therebetween.

A valve member 38 is slidably positioned within the outer end 28 of the annular body 24 and is resiliently biased toward the free end of the annular body 24 by a coil spring 40 which is trapped between a recess 42 in the inner end of the valve member 38 and a radially outwardly projecting shoulder 44 in the end portion 14 of the annular member 12. The inner end of the valve member 38 is larger in diameter than the outer end thereof and forms a generally frustoconically shaped transitional portion 46 therebetween. The frustoconically shaped portion 46 of the valve member 38 engages a complemental generally frustoconically shaped portion 48 on the interior of the annular body 24 to limit the travel of the valve member 38 within the annular body 24 under the influence of the spring 40. The outer end of the valve member 38 is imperforate and blocks flow through the interior of the annular body 24 when the frustoconical portion 46 of the valve member 38 is in engagement with the frustoconical portion 48 of the annular body 24, as is illustrated in FIG. 1. Leakage between the outside of the valve member 38 and the inside of the annular body 24, whose inside diameter is only slightly greater than th outside diameter of the valve member 38, is substantially prevented by positioning a nitrile O-ring 50 therebetween, an inwardly facing annular recess 52 being provided on the inside of the annular body 24 to retain the O-ring 50.

Figure 3:
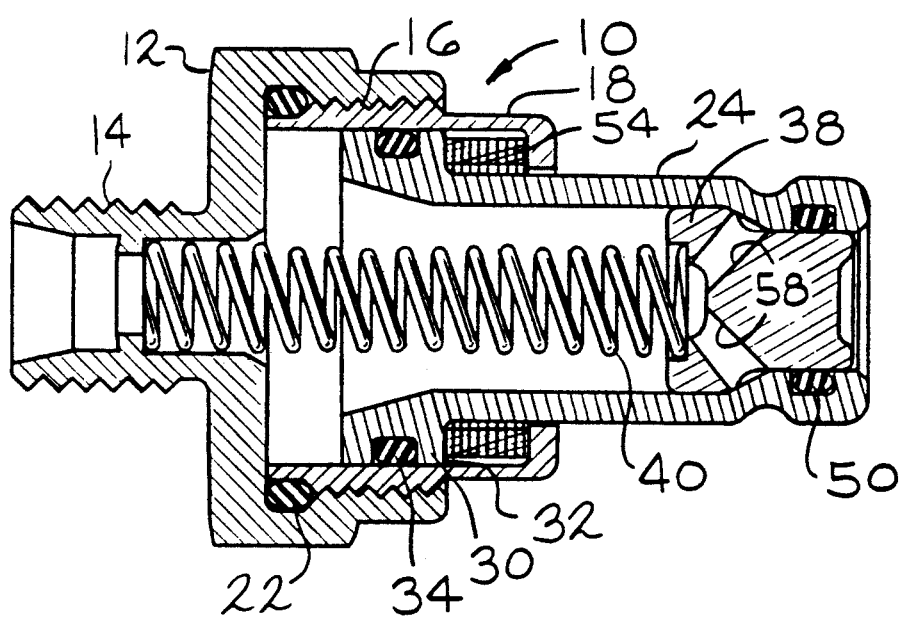
FIG. 3 is a view similar to FIGS. 1 and 2 of one of the coupling elements thereof in an uncoupled, pressure relieving condition.

Excessive pressure within the male coupling element 10, in its FIG. 1, uncoupled condition, is relieved by the movement of the annular body 24 and the valve member 38, in unison, with respect to the annular retainer 18. This movement can be seen by comparing the positions of the annular body 24 and the valve member 38 in FIG. 3, in their pressure relieving positions, to their corresponding positions in FIG. 1. The movement of the annular body 24 and the valve member 38 from their FIG. 1 positions to their FIG. 3 positions is resiliently retarded by a wave spring 54 which is trapped between the radial shoulder 32 on the annular body 24 and an inturned flange 56 at the outlet or downstream end of the annular retainer 18. A small degree of movement of the annular body 24 and the valve member 38 relative to the annular retainer 18, against the restoring face of the wave spring 54, will very substantially reduce the pressure of the fluid within the male coupling element 10 or within an enclosed portion of the conduit section to which it is secured in fluid communication therewith, when the fluid is a substantially incompressible fluid. Thus, the coupling which is made up of the male coupling element 10 and the female coupling element 60 is especially adapted for use in systems for transporting liquids, such as water and aqueous solutions of ethylene glycol.

The female coupling element 60 includes an annular member 62 with a reduced diameter, externally threaded conduit connection end 64. A major portion of the length of the annular member 62, from a coupling end 66 thereof in the FIG. 1, uncoupled condition of the coupling element 60 partly to the conduit connection end 64 of the annular member 62, is surrounded by an annular sleeve 68. The annular sleeve 68 is resiliently biased toward the coupling end 66 of the annular member 62 by a coil spring 70, which is trapped between a generally radially extending annular shoulder 72 of the annular sleeve 68 and a generally radially extending annular shoulder 74 of an annular retainer 76. The annular retainer 76 is positioned coaxially between the annular sleeve 68 and the annular member 62, and is retained in place with respect to the exterior of the annular member 62 by a double-ended wire 78, which is received in opposed recesses 80, 82 in the exterior of the annular member 62 and the inside diameter of the annular shoulder 74 of the annular retainer 76, respectively. The forward travel of the annular sleeve 68 relative to the annular member 62 is limited by a first set of circumferentially spaced apart metallic balls 84, each of which is received in an aperture 86 in the annular member 62. In the FIG. 1, uncoupled condition of the coupling element 60, each of the metallic balls is radially positioned by its engagement with an enlarged diameter portion of an annular valve sleeve 90, to engage a generally frustoconical surface 92 on the interior of the annular sleeve 68, and thereby prevent the annular sleeve 68 from being urged beyond the coupling end 66 of the annular member 62 by the coil spring 70.

The annular valve sleeve 90 surrounds and is slidable with respect to a valve member 94, a conduit connection end 96 of which is threadably received in the conduit connection end 64 of the annular member 62. The valve member 94 further has an enlarged, imperforate coupling end 98 which extends beyond and is larger in diameter than a free, coupling end of the annular valve sleeve 90, and blocks fluid flow through the valve member 94, and thus, through the coupling element 60, in the FIG. 1 uncoupled condition of the coupling element 60. In that regard, the valve sleeve 90 is resiliently biased into sealing engagement with the coupling end 98 of the valve member 94 in its FIG. 1 condition by a coil spring 100, which surrounds the exterior of the valve member 94 and is trapped between a radially extending inner shoulder 102 of the valve sleeve 90 and a radially extending inner shoulder 104 of the annular member 62.

Figure 2:
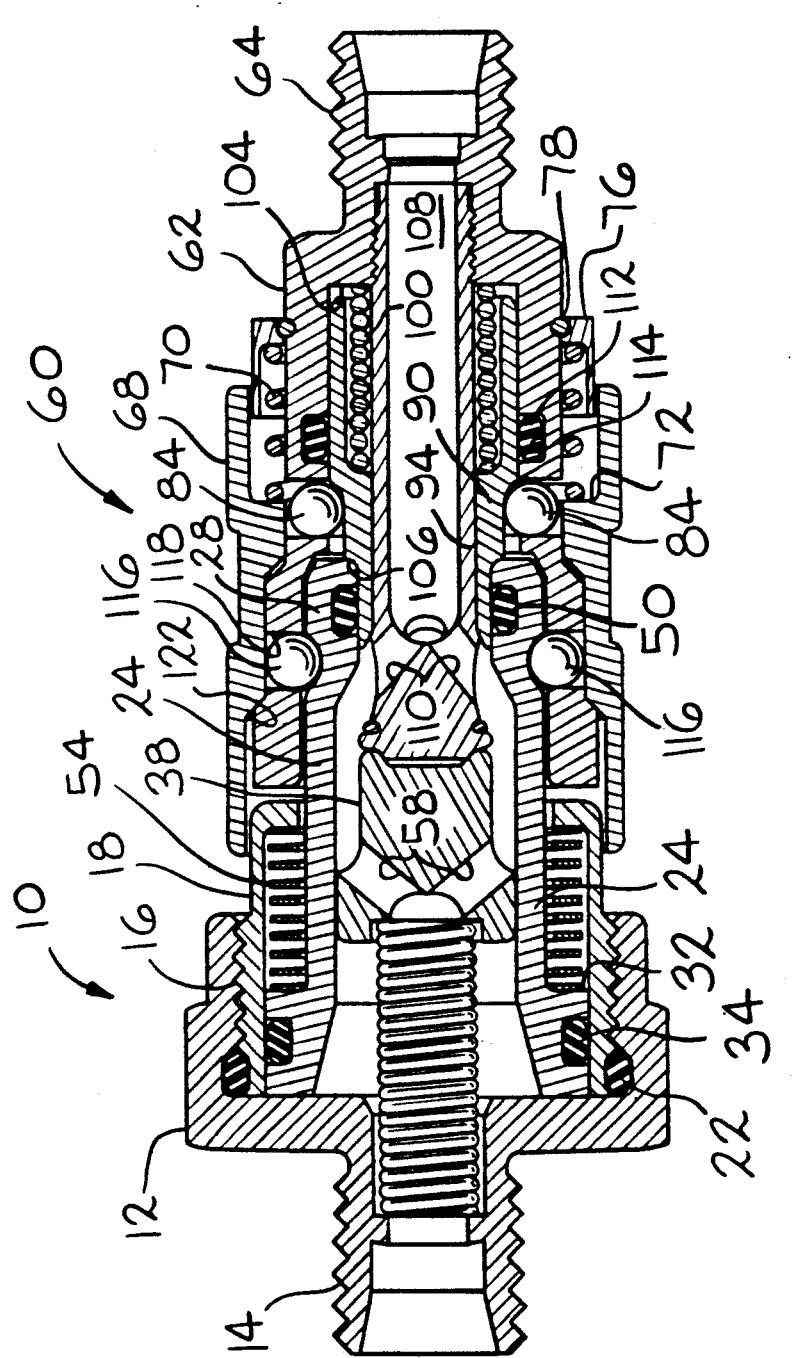
FIG. 2 is a view similar to FIG. 1 of the quick disconnect coupling thereof in an assembled or coupled relationship of the coupling elements thereof.

When the coupling elements 10 and 60 are joined, the coupling end 98 of the valve member 94 will engage the outer end of the valve member 38 and will move it inwardly within the annular member 10 to a location entirely inwardly of the frustoconical portion 48 of the annular body 24, as is shown in FIG. 2. This will open the coupling element 10 to fluid flow through an annulus defined by the exterior of the valve member 38 and the surrounding portion of the interior of the annular body 24, a plurality of circumferentially spaced apart, obliquely extending flow passages 58 being provided within the inner, larger diameter portion of the valve member 38, from the recess 42 therein, to provide fluid communication through the valve member 38 to such annulus. At the same time, the joining of the coupling elements 10 and 60 will result in the inward movement of the valve sleeve 90 of the coupling element 60 relative to the valve member 94, against the restoring force of the spring 100, by the engagement of the leading surface of the outer end 28 of the annular body 24 of the coupling element 10 with a radially extending outer shoulder 106 of the valve sleeve 90. This will open the coupling element 60 to flow through a hollow inner end portion 108 of the valve member 94, a plurality of circumferentially spaced apart, obliquely extending flow passages 110 being provided in the valve member 94 to permit fluid to flow thereinto from the annulus between the valve member 38 and the annular body 24 of the coupling element 10.

The O-ring 50 of the coupling element 10, which sealingly engages the exterior of the valve member 38 in the FIG. 1, uncoupled condition of the coupling element 10 as heretofore explained, sealingly engages the exterior of the annular valve sleeve 90 in the FIG. 2, coupled condition of the coupling elements 10 and 60. Further, the coupling element 60 is provided with a nitrile O-ring 112 in a radial recess 114 in the interior of the annular member 62 to sealingly engage the exterior of the valve sleeve 90 both in its FIG. 1 position and its FIG. 2 position, and thereby substantially prevent leakage between the annular member 62 and the valve sleeve 90, notwithstanding the relative movement which can occur between such components.

In the FIG. 2, coupled condition of the coupling elements 10 and 60, the coupling elements 10 and 60 are frictionally retained in their coupled condition by a second set of circumferentially spaced apart metallic balls 116, each of which is received in an aperture 118 in the annular member 62. In the FIG. 2, coupled condition of the coupling elements 10 and 60, the balls are trapped between a reduced inside diameter of the annular sleeve 68 and an annular recess 120 in the exterior of the outer end 28 of the annular body 24 of the coupling element 10. To disconnect the coupling elements 10 and 60, the annular sleeve 68 of the coupling element 60 is manually moved away from the coupling element 10, against the restoring force of the spring 70, until the balls 116 clear a frustoconical shoulder 122, at which time the balls 116 are free to move radially outwardly within the apertures 118 to clear the annular recess 120. Similarly, the initial coupling of the coupling elements 10 and 60 involves the manual movement of the annular sleeve 68 of the coupling element 60 away from an adjacent coupling element 10 to allow the outer end of the annular body 24 to enter the coupling element 10 until the balls 116 are radially aligned with the recess 120, at which time the manual force on the sleeve 68 is released to allow it to advance toward the coupling element 10 under the restoring force of the spring 100.

The coupling of the present invention, as described, inherently prevents any material degree of leakage from the coupling elements 10 and 60 when they are disconnected from one another and at all times while they are disconnected. The coupling further prevents any material degree of air ingestion into the coupling elements 10 and 60 as they are being connected and at all times while they are connected.

Although the best mode contemplated by the inventors for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed is:

1. A coupling element for a fluid line quick disconnect coupling, said coupling element comprising:
   an annular member having opposed ends, a first portion of said annular member extending from one of the opposed ends and being adapted to being connected to a section of a fluid conduit, said annular member having an internal radially extending shoulder between its opposed ends;
   an annular body having at least a first portion positioned within said annular member and a second portion, said second portion having a restricted outlet, said annular body being movable within and with respect to said annular member between a first position, wherein an end of said first portion of said annular body is positioned adjacent to said radially extending shoulder of said annular member, and a second position, wherein said end of the annular body is positioned further away from said radially extending shoulder of said annular body;
   first biasing means resiliently biasing said annular body toward said first position of said annular body;
   a valve member having an imperforate end portion, said valve member being positioned within said second portion of said annular body and being movable within and with respect to said annular body between a first position, wherein said end portion of said valve member is within said restricted outlet of said annular body and substantially blocks fluid flow through said annular body, and a second position, wherein said end portion of said valve member is away from said restricted outlet of said annular body and fluid is free to flow through said annular body; and
   second biasing means resiliently biasing said valve member toward said first position of said valve member;
   an increase in fluid pressure within said coupling element, when said valve member is in said first position of said valve member, being effective to move said valve member and said annular body, in unison, to said second position of said annular body with respect to said annular member, and thereby relieve fluid pressure within said coupling element by increasing the internal volume thereof.

2. A coupling element according to claim 1 wherein a second portion of said annular member is substantially larger in its internal diameter than first portion of said annular member, said radially extending shoulder of said annular member being formed at a juncture between said first portion and said second portion of said annular member.

3. A coupling element according to claim 2 wherein said end of said first portion of said annular body is positioned in abutment against said radially extending shoulder of said annular member in said first position of said annular body.

4. A coupling element according to claim 1 and further comprising:
   an annular retainer positioned coaxially between a second portion of said annular member and said first portion of said annular body, said annular retainer being fixedly positioned with respect to said annular member, said first biasing means being trapped between an external radially extending shoulder of said annular body and an inturned flange portion of said annular retainer.

5. A coupling element according to claim 4 wherein at least a portion of said first portion of said annular body has an external diameter which is nearly as large as an internal diameter of a portion of said annular retainer which is immediately adjacent to said at least a portion of said first portion of said annular body in each of said first position and said second position of said annular body, said coupling element further comprising:
   first O-ring sealing means carried by said at least a portion of said first portion of said annular body for substantially preventing fluid leakage between said annular body and said annular retainer.

6. A coupling element according to claim 5 wherein said radially extending shoulder of said annular body is formed at a juncture between said at least a portion of said first portion of said annular body and another portion of said first portion of said annular body which is immediately adjacent to said at least a portion of said first portion of said annular body.

7. A coupling element according to claim 6 wherein said first biasing means comprises a wave spring.

8. A coupling element according to claim 5 and further comprising:
- second O-ring sealing means concentrically positioned between the outside of said annular retainer and the inside of said second portion of said annular member, said second O-ring sealing means substantially preventing fluid leakage between said annular retainer and said annular member.

9. A coupling element according to claim 1 wherein said valve member further has an inner end portion, said inner end portion of said valve member being larger in diameter than said imperforate end portion and forming an external shoulder therebetween, and wherein said second portion of said annular body has an interior shoulder positioned interiorly of said restricted outlet, said external shoulder of said valve member engaging said interior shoulder of said second portion of said annular body in said first position of said valve member to prevent said second biasing means from biasing said valve member beyond said first position of said valve member.

10. A coupling element according to claim 9 wherein each of said external shoulder of said valve member and said interior shoulder of said annular body is frustoconical in configuration and is complemental in configuration to the other of said external shoulder of said valve member and said interior shoulder of said annular body, and wherein said valve member further comprises passage means extending obliquely through said inner end portion of said valve member to said external shoulder of said valve member.

11. A coupling element according to claim 10 wherein said passage means comprises a plurality of circumferentially spaced apart, obliquely extending passages.

12. A coupling element according to claim 8 wherein said annular body has an inwardly facing recess, and further comprising:
- third O-ring sealing means positioned in said annular recess, said third O-ring sealing means sealingly engaging the exterior of said valve member when said valve member is in said first position of said valve member and substantially preventing fluid leakage between said annular body and said valve member when said valve member is in said first position.

13. A quick disconnect coupling for a fluid line, said quick disconnect coupling comprising:
- a first coupling element, said first coupling element comprising;
- an annular member having opposed ends, a first portion of said annular member extending from one of the opposed ends being adapted to being connected to a section of a fluid conduit, said annular member having an internal radially extending shoulder between its opposed ends,
- an annular body having at least a first portion positioned within said annular member and a second portion, said second portion having a restricted outlet, said annular body being movable within and with respect to said annular member between a first position, wherein an end of said first portion of said annular body is positioned adjacent to said radially extending shoulder of said annular member, and a second position, wherein said end of the annular body is positioned further away from said radially extending shoulder of said annular body,
- first biasing means resiliently biasing said annular body toward said first position of said annular body,
- a valve member having an imperforate end portion, said valve member being positioned within said second portion of said annular body and being adapted to be movable within and with respect to said annular body between a first position, wherein said end portion of said valve member is within said restricted outlet of said annular body and will substantially block fluid flow through said annular body, and a second position, wherein said end portion of said valve member is away from said restricted outlet of said annular body and fluid is free to flow through said annular body, and
- second biasing means resiliently biasing said valve member toward said first position of said valve member; and
- a second coupling element releasably engaging said first coupling element at a first end of said second coupling element, said second coupling element having an opposed end which is adapted to being connected to another section of a fluid conduit and comprising,
- valve means carried by said second coupling element, said valve means engaging said valve member of said first coupling element and maintaining said valve member in said second position of said valve member.

14. A coupling according to claim 13 wherein said valve member of said first coupling element comprises recess means in the exterior thereof and wherein said second coupling element further comprises;
- manually operable engagement means releasably engaging said recess means in said valve member of said first coupling element.

15. A coupling according to claim 13 wherein said first coupling element further comprises;
- an annular retainer positioned coaxially between a second portion of said annular member and said first portion of said annular body, said annular retainer being fixedly positioned with respect to said annular member, said first biasing means being trapped between an external radially extending shoulder of said annular body and an inturned flange portion of said annular retainer.

16. A coupling according to claim 13 wherein said annular body of said first coupling element has an inwardly facing recess and further comprises;
- O-ring sealing means positioned in said annular recess, and
- wherein said second coupling element further comprises;
- an annular valve sleeve surrounding said valve means of said second coupling element being movable with respect to said valve means, said O-ring sealing means sealingly engaging the exterior of said annular valve sleeve when said valve member of said first coupling element is maintained in its second position by engagement with said valve means of said second coupling element.

* * * * *